(12) United States Patent
Foxx et al.

(10) Patent No.: US 8,713,773 B2
(45) Date of Patent: May 6, 2014

(54) GASKET REMOVAL AND VENTING TOOL

(75) Inventors: Michael J. Foxx, Hillsborough, NJ (US); Edgardo Jimenez, Bordentown, NJ (US)

(73) Assignee: Strato, Inc., Piscataway, NJ (US)

(*) Notice: Subject to any disclaimer, the term of this patent is extended or adjusted under 35 U.S.C. 154(b) by 505 days.

(21) Appl. No.: 13/093,496

(22) Filed: Apr. 25, 2011

(65) Prior Publication Data

US 2012/0266458 A1 Oct. 25, 2012

(51) Int. Cl.
*B25B 27/00* (2006.01)

(52) U.S. Cl.
USPC .............................................. 29/270; 29/278

(58) Field of Classification Search
USPC .............................. 29/270, 244–269, 271–282
See application file for complete search history.

(56) References Cited

U.S. PATENT DOCUMENTS

| | | | | |
|---|---|---|---|---|
| 1,989,918 A | * | 2/1935 | Drypolcher | 254/28 |
| D207,184 S | | 3/1967 | Williams | |
| 3,698,689 A | * | 10/1972 | Poskin | 254/28 |
| 4,049,236 A | * | 9/1977 | Grill et al. | 254/28 |
| 4,172,313 A | | 10/1979 | Takahashi | |
| D256,442 S | * | 8/1980 | Martin | D10/77 |
| 5,031,881 A | * | 7/1991 | Thurmston | 254/28 |
| 5,075,945 A | | 12/1991 | Krzecki | |
| 5,153,974 A | | 10/1992 | Follens | |
| 5,253,406 A | * | 10/1993 | Shere et al. | 29/240 |
| D359,209 S | | 6/1995 | Carey | |
| 5,495,651 A | * | 3/1996 | Tsuha | 29/235 |
| 5,564,175 A | | 10/1996 | Nejad | |
| 5,909,910 A | * | 6/1999 | Shaffer | 29/243.56 |
| D438,072 S | | 2/2001 | Karlsson | |
| 6,886,229 B1 | * | 5/2005 | Wilson | 29/267 |
| 7,048,255 B2 | * | 5/2006 | Buch et al. | 254/28 |
| D530,576 S | | 10/2006 | Levan | |
| 2003/0029277 A1 | | 2/2003 | Lummis | |
| 2006/0042062 A1 | | 3/2006 | Tally | |
| 2010/0237569 A1 | | 9/2010 | Jimenez et al. | |
| 2012/0266458 A1 | * | 10/2012 | Foxx et al. | 29/801 |

OTHER PUBLICATIONS

International Search Report and Written Opinion From Corresponding International Application No. PCT/US12/31354, Mailed Jun. 22, 2012—9 pages.

* cited by examiner

*Primary Examiner* — Lee D Wilson

(74) *Attorney, Agent, or Firm* — Brendan Mee Law, P.C.

(57) ABSTRACT

A tool, method and system are provided adapted to remove a gasket from a glad hand fitting, and also to vent pressurized air from between two coupled glad hand fittings. A tool is provided with an angled tool head, adapted to be received in a glad hand fitting and to be positioned against a surface of the guard arm of the glad hand. The tip of the tool head is positioned against the gasket and the tool is pivoted against the glad hand to bias the gasket out of the recess in the glad hand fitting.

17 Claims, 3 Drawing Sheets

GASKET REMOVAL AND VENTING TOOL

BACKGROUND OF THE INVENTION

1. Field of the Invention

The invention is directed to a tool for removing a gasket from a glad hand connector in a railway car brake hose system which may also be used to vent pressurized air from coupled glad hand connectors.

2. Description of Related Art

In a railway car brake hose line, the flexible end hoses of two railway cars are connected by glad hand fittings on the respective end hoses. The glad hand fittings are rotated into place, pressing the gaskets together and forming an air-tight seal. Guard arms on each glad hand align the closed fittings and compress the gaskets. In an Association of American Railroads ("AAR") standard gland hand coupling, the distance between facing surfaces of two coupled glad hand fittings is ⅛ inch.

U.S. Patent Application Publication 2010/0237569 discloses a modified glad hand and gasket combination for forming an air tight connection between two glad hand coupling members. The published application is incorporated by reference herein for its description of a gasket and glad hand combination. This application discloses an "extra wide" gasket with an increased surface area facing the adjacent gasket. The extra wide gasket represents an improvement over prior air brake hose connections, however, there remains a problem that the gaskets are not easily removed and glad hand connectors are not easily and safely uncoupled. An end hose with trapped pressurized air in it may fly about when decoupled, and impact with the glad hand fitting may cause damage to equipment or injure personnel.

Therefore, there is a need in the art for a tool that can vent air at the junction of two glad hands, and which can be used to remove a gasket from a glad hand fitting.

SUMMARY OF THE INVENTION

These and other objects of the invention are achieved with a tool for removing a gasket from a glad hand connector of a railway car brake line, comprising in one piece: a handle; a first shank contiguous with the handle; a second shank, contiguous with the first shank, forming an angle of about 0-90 degrees with the first shank; a tool head, having about the same width as the second shank, being thinner than the second shank, and having a tip with at least two tines separated by an air release slit. The tool head forms an angle of about 35-65 degrees with the second shank. A step is contiguous with and joins the tool head and the second shank so that the second shank and the step form a curved bottom surface adapted to be slidingly positioned against the guard arm of the glad hand. Thus, the length of the tool head from the tip of the tool head to the curved surface is the distance from a top edge of the recess in the glad hand to a surface on the guard arm against which the bottom surface of the tool is positioned.

A method of using the tool comprises the steps of: providing a glad hand fitting having a recess with a top edge, and further having a guard arm with a side wall surface; providing a gasket in the recess so that a mating surface of the gasket extends beyond the top edge of the recess; placing a tool as described above so that the curved surface on the bottom of the tool contacts the side wall surface of the guard arm and so that the tip of the tool contacts the gasket where the gasket extends beyond the edge of the recess; and applying downward force on the handle of the tool so that the curved surface of the tool slides against the side wall surface of the guard arm and biases the gasket out of the recess of the fitting.

The invention is also a system for removing a gasket from a glad hand and gasket combination, the system comprising: a glad hand having a guard arm and a recess to receive a gasket. The gasket is received in the recess and has a planar mating surface extending beyond the top edge of the recess. The system further comprises a gasket removal tool, as described above, placed so that the tool head is placed against a portion of the gasket extending beyond the top edge of the recess, and the bottom surface of the tool formed by the step and the second shank is placed against the sidewall surface of the guard arm. The tool may then be pivoted by applying downward force on the handle so that the gasket is biased inwardly and removed from the recess.

The invention is also a system and corresponding method for venting air under pressure between two coupled glad hand fittings, the system comprising: a tool as described above, and a glad hand and gasket combination as described above, wherein the air slit between the two tines of the tool head of the tool is sized so that one end of the air slit is adapted to be placed on the interior of the fitting while the opposite end of the air slit is outside the fitting.

DETAILED DESCRIPTION OF THE INVENTION

Figure 1:
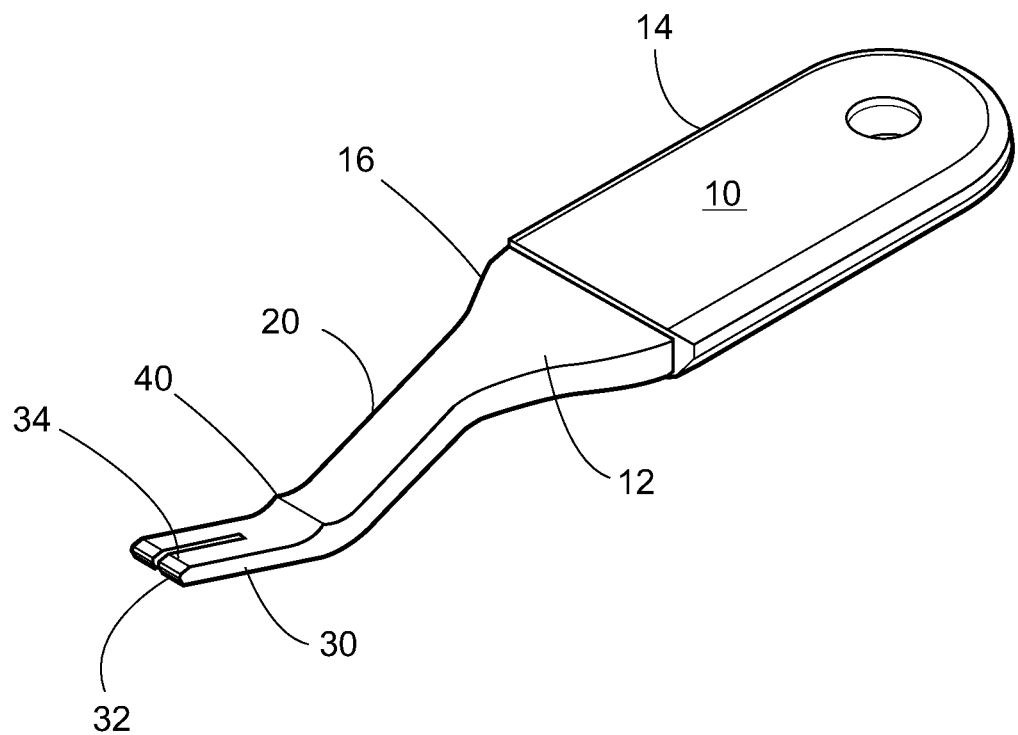
FIG. 1 is a perspective view of the tool according to the invention.

As shown in FIG. 1, a tool according to the invention comprises in one piece, a handle 10, first shank 12, second shank 20, and tool head 30. So that the tool head may be inserted between two coupled AAR standard glad hand fittings, the thickness "t" of the tool head is no more than ⅛ inch, and preferably the thickness is about ⅛ inch. Dimensions recited herein modified by the word "about," are understood to allow for normal manufacturing tolerances, typically ±0.010 inches when the dimension is given in inches fractionally, or to two decimal places. When the dimension is given to three decimal places, the tolerances typically are ±0.005.

It is preferred that the sides 16 of the first shank 12 be tapered, so that the width of the handle is greater than the width of the tool head 30. For example, the width of the handle may be in a range of about 1 to about 1½ inches, most preferably about 1⅜ inch. The handle 10 may be provided with a cladding 14 of some convenient comfortable plastic material for ease of handling, although this is not critical.

A step 40 is located between and joins the second shank 20 and the tool head 30. The step joins the thinner thickness of the tool head to the greater thickness of the second shank. Preferably, the thickness of the first and second shank is the same and is greater than 3/16 inch, most preferably about ¼ inch. The step and the second shank form a curved surface 44 on the bottom surface of the tool. In operation, the curved bottom surface contacts a surface on the guard arm of the glad hand and allows for sliding and pivoting movement in the direction of the arrow shown in FIG. 4 when downward force is applied to the handle. The curved surface is said to start at the point where, traveling from the tip of the tool head to the second shank, the bottom surface first deviates from a straight line.

The width of the tool head is preferably equal to or greater than about 0.250 inches, so that an air release slit can be provided between two tines of sufficient strength and so that the tip of the tool head does not damage the gasket. The width of the tool is preferably equal to or less than about 0.450, so that the tool head may be positioned against the gasket with the proper "bite." Most preferably, the width of the tool head is about 0.350 inches. The tip of the tool head is conveniently provided with a taper in the thickness direction so that the tool head 30 forms a chamfered edge 32.

Figure 2:
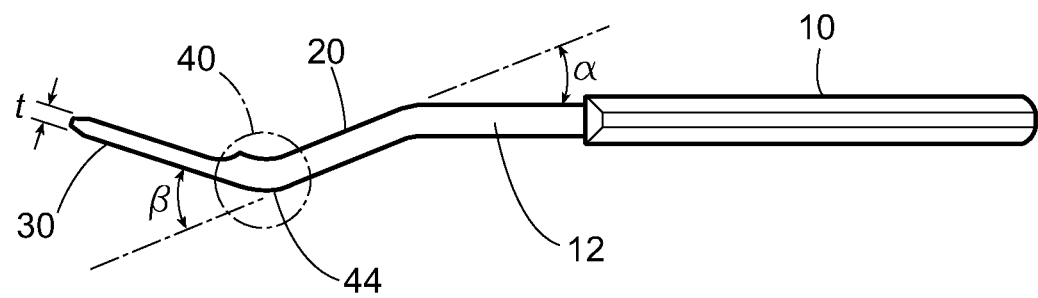
FIG. 2 is a side view of the tool according to the invention.

As shown in the side view of FIG. 2, the tool head 30 creates an angle $\beta$ of about 35 to about 65 degrees with respect to the second shank 20, preferably this angle is about 40 to about 60 degrees, and most preferably 60 degrees. The word "about," as used in this context, means falling within generally accepted manufacturing tolerances, typically ±2 degrees.

Figure 4:
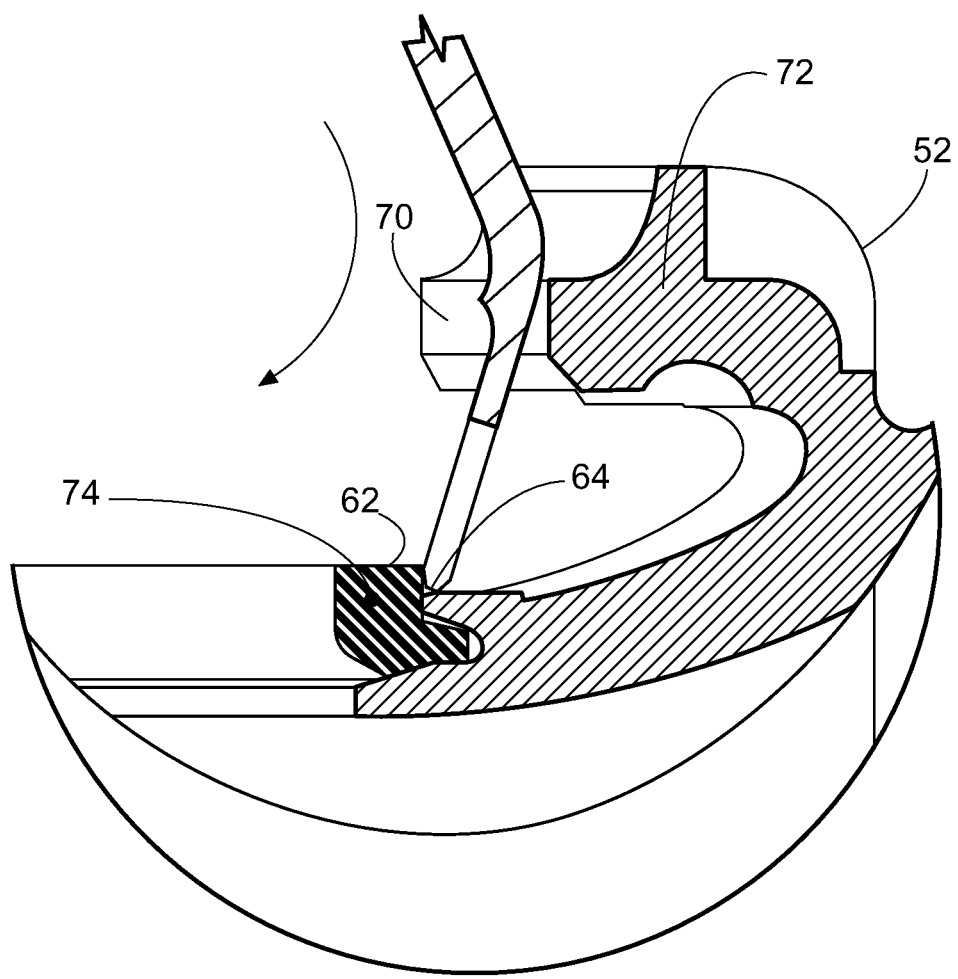
FIG. 4 is a view of a system for removing a gasket from a glad hand and gasket combination.

FIG. 4 depicts a glad hand fitting 52 having a recess 60 having a top edge 64. As shown in FIG. 4, the recess is provided with indentations for securing gasket 74. The glad hand fitting also includes a guard arm 72, including a side wall surface 70. A planar mating surface 62 of the gasket extends beyond the top edge 64 of recess 60, in effect providing a ledge against which chamfered edge 32 of the tool may be positioned.

Referring to FIG. 4, the angle $\beta$ is selected so that the tool head 30 can slide against the side wall surface 70 of the guard arm, and pivot about the step portion 40 in the direction of the arrow in FIG. 4, with the tip 32 contacting the portion of the gasket that extends beyond the lip of the recess 60 long enough to push the side of the gasket out of the recess 60. The most preferred angle $\beta$ for use with a standard glad hand fitting and gasket combination (conventional or "extra wide") is about 60 degrees.

A second angle $\alpha$ ensures that the operator's hand is positioned ergonomically with respect to the recess 60 of the gland hand when the tool is inserted to remove the gasket. Generally, angle $\alpha$ is in a range of 0 to 90 degrees. More preferably, angle $\alpha$ is about 20 to 60 degrees. To allow the tool to lie flat, when the angle $\beta$ is about 60 degrees, angle $\alpha$ is most preferably about 20 to 25 degrees. The handle and the first shank are preferably formed in a straight line.

Figure 3:
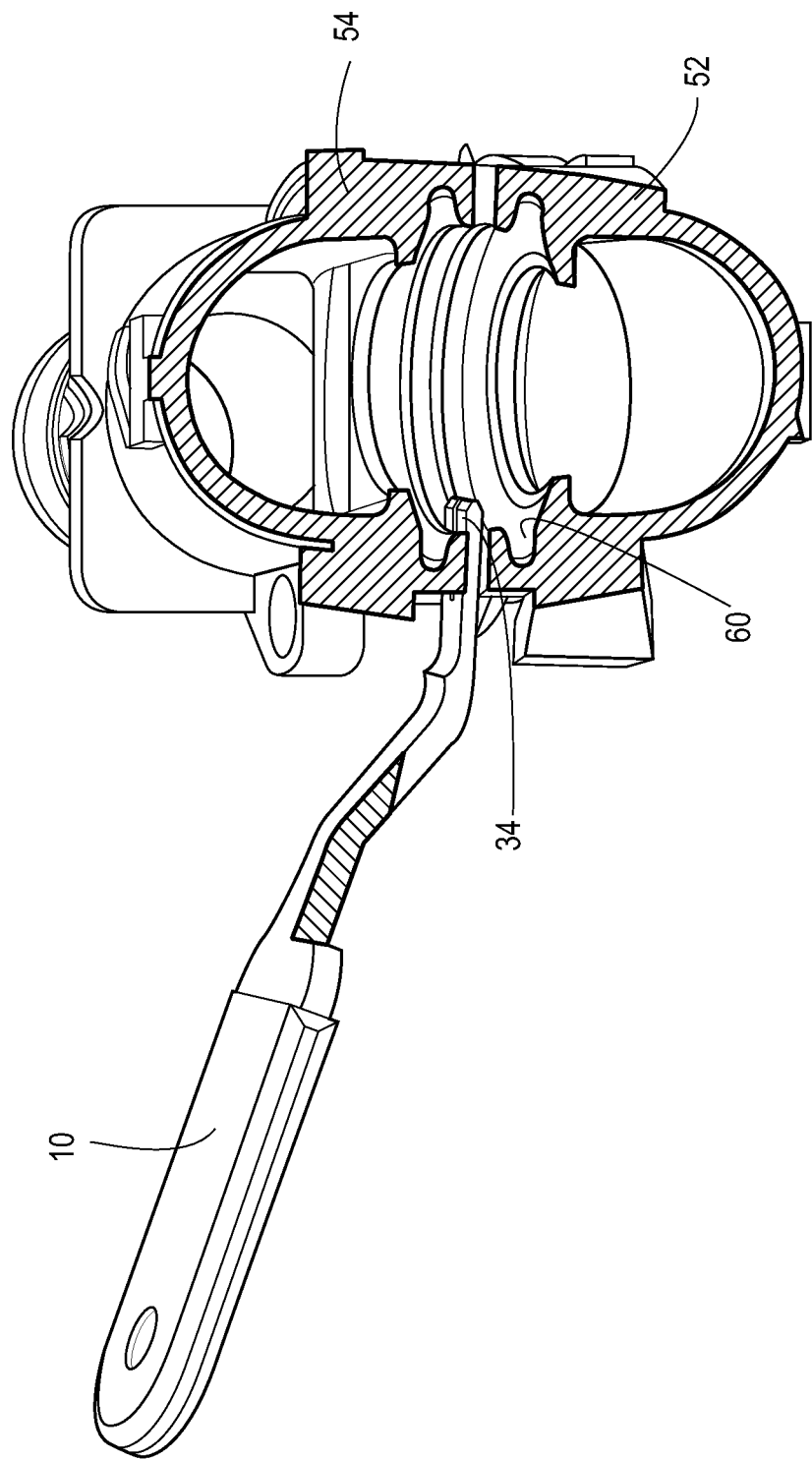
FIG. 3 is a view of a system for venting air under pressure from between two coupled glad hand fittings.

Two tines of the tool head 30 are separated by an air release slit 34. As depicted in FIG. 3, a system for venting pressurized air from coupled gland hands requires that the tool head is tapered to a chamfered edge so that it can be worked between the gaskets. Also, the length of the air release slit 34 is such that one end of the air release slit is adapted to be placed on the interior of the fitting while the opposite end is outside the fitting. The length of the air release slit is generally in a range of 0.5 inches to about 0.8 inches, and preferably is about 0.625 inches or greater. The air release slit is shorter than the length of the tool head, which is preferably ⅞ to 1⅛ inch in length. Once the tool head is worked between the gaskets, pressurized air can be vented through the air release slit 34. Unlike a screwdriver, the gasket removal and venting tool according to the invention may be left in place while air escapes through the air release slit. The width of the air release slit impacts how quickly air is vented from a coupled pair of glad hands. A width of 0.050 to 0.080, preferably 0.050 inch, and a length of 0.625 inch have been found to allow for venting the system in approximately a minute. A wider air release slit might be used to decrease that time, but this dimension should be selected carefully so that the individual tines are not weakened, and so that the "bite" of the tip of the tool head with the gasket is not negatively impacted.

After the pressurized air is vented, the glad hands are decoupled by rotating. As noted above, in a glad hand and gasket combination, a clearance is provided between the facing surfaces of two glad hand fittings so that they can be twisted for removal. Likewise, coupling two adjacent fittings causes the gaskets to be compressed, but allows for a clearance of about ⅛ inch. A system for removing the gasket from the glad hand and gasket combination can be described as comprising a glad hand fitting 52 having a guard arm 72 and a recess 60 to receive a gasket 74 as described above. A gasket is secured in the recess of the glad hand and has a planar mating surface extending beyond the top edge of the recess as described above. A gasket removal tool is provided as described above. The guard arm of the glad hand has a side surface 70 contacting the curved bottom surface 44 of tool head where the tool head joins the second shank, so that the tool pivots about the step 40 while the tip of the tool head contacts the gasket and biases the gasket inward when downward force is applied to the handle. Angle $\beta$ is selected so that, when the handle is moved in a direction opposite to the arrow in FIG. 4, the tip 32 of the tool head remains in contact with the gasket for a time sufficient to pry the gasket from the recess.

Thus, the tool according to the invention conveniently performs two functions: venting air between coupled glad hand fittings, and removing the gaskets. These functions are performed with one tool. Conventionally, operators have either run the risk of de-coupling fittings while the connection is still pressurized, or they have used a screwdriver to vent the gasket connection, which requires the screwdriver to be held in place during the operation. Moreover, a screwdriver head is prone to damage the gaskets. Further, there is no easy way conventionally to remove a gasket from a glad hand fitting, whereas the claimed invention advantageously uses surfaces inherently present in the fitting to provide leverage for using the tool. In other words, the use of the guard arm side wall surface, together with the lip created by the mating surface of the gasket extending from the top edge of the recess in the glad hand, permits the use of the tool claimed herein to great advantage.

The description of the preferred embodiments herein is not to be considered as limiting the invention, which is defined by the appended claims.

What is claimed is:

1. A tool for removing a gasket from a recess in a glad hand connector of a railway car brake line, comprising, in one piece:
   a handle;
   a first shank contiguous with the handle;
   a second shank contiguous with the first shank and forming a first angle of 20-60 degrees with the first shank;
   a tool head having about the same width as the second shank, being thinner than the second shank, and having a tip and at least two tines separated by an air release slit and forming a second angle of 35-65 degrees with the second shank;
   a step contiguous with and joining the tool head and the second shank;
   the second shank and the step forming a curved bottom surface adapted to be slidingly positioned against the guard arm of a glad hand;
   wherein the length of the tool head from the tip of the tool head to the curved surface extends from the top edge of the recess in the glad hand to the surface of the guard arm of the glad hand.

2. The tool according to claim 1, wherein the tool head has a thickness equal to or less than 1/8 inch.

3. The tool according to claim 1, wherein the tool head forms a second angle of 60 degrees with the second shank.

4. The tool according to claim 1, wherein the length of the tool head from the tip of the tool head to the curved bottom surface is in a range of about 7/8 inch to about 1 1/8 inch.

5. The tool according to claim 1, wherein the tool head and the second shank have substantially the same width, in a range of about 0.35 inches to about 0.45 inches.

6. The tool according to claim 1, wherein the sides of the first shank are tapered so that the handle is wider than the second shank.

7. The tool according to claim 1, wherein the tip of the tool head is tapered to a chamfered edge.

8. The tool according to claim 1, wherein the tool head is sized with respect to a glad hand fitting so that one end of the air slit is adapted to be placed on the interior of the fitting while the opposite end of the air slit is outside the fitting.

9. The tool according to claim 1, wherein the length of the air release slit is about 5/8 inch.

10. A method for venting air under pressure between two coupled glad hand fittings, comprising the steps of:
   inserting a tool according to claim 1 between two adjacent gaskets received in two respective coupled glad hand fittings,
   placing the tool so that one end of the air release slit is on the inside of the glad hand fittings while an opposed end of the air release slit is on the outside of the fittings until pressurized air is vented between the coupled glad hand fittings.

11. The tool according to claim 1, wherein the tool head has a thickness equal to or less than 1/8 inch.

12. A system for removing a gasket from a glad hand and gasket combination, comprising:
   a glad hand having a recess to receive a gasket and a guard arm having a sidewall surface;
   a gasket secured in the recess of the glad hand and having a planar mating surface extending beyond a top edge of the recess; and
   a gasket removal tool according to claim 1;
   the guard arm of the glad hand having a sidewall surface contacting the curved bottom surface of the tool, so that applying downward force on the handle of the tool causes the curved bottom surface to slide along the sidewall surface of the guard arm, pivoting the tool and biasing the gasket inward and out of the recess.

13. The system according to claim 12, wherein the tool head has a thickness equal to or less than 1/8 inch.

14. The system according to claim 12, wherein the tool head forms a second angle of 60 degrees with the second shank.

15. The system according to claim 12, wherein the tip of the tool head is tapered to a chamfered edge.

16. The system according to claim 12, wherein the tool head is sized with respect to a glad hand fitting so that one end of the air slit is adapted to be placed on the interior of the fitting while the opposite end of the air slit is outside the fitting.

17. The system according to claim 12, wherein the length of the air release slit is about 5/8 inch.

* * * * *